(12) United States Patent
Robertson

(10) Patent No.: US 10,791,858 B2
(45) Date of Patent: Oct. 6, 2020

(54) MULTI-FUNCTIONAL MODULAR DRINK ASSEMBLY

(71) Applicant: Patrick L. Robertson, Springfield, VA (US)

(72) Inventor: Patrick L. Robertson, Springfield, VA (US)

(*) Notice: Subject to any disclaimer, the term of this patent is extended or adjusted under 35 U.S.C. 154(b) by 219 days.

(21) Appl. No.: 15/969,473

(22) Filed: May 2, 2018

(65) Prior Publication Data
US 2019/0274457 A1 Sep. 12, 2019

Related U.S. Application Data

(60) Provisional application No. 62/640,729, filed on Mar. 9, 2018.

(51) Int. Cl.
| | | |
|---|---|---|
| *A47J 31/18* | (2006.01) | |
| *A47J 31/00* | (2006.01) | |
| *A47J 31/06* | (2006.01) | |
| *A47J 43/27* | (2006.01) | |
| *A47G 23/02* | (2006.01) | |
| *B65D 47/08* | (2006.01) | |
| *B65D 43/02* | (2006.01) | |
| *A47G 19/22* | (2006.01) | |

(52) U.S. Cl.
CPC ..... *A47G 19/2272* (2013.01); *A47G 23/0241* (2013.01); *A47J 31/005* (2013.01); *A47J 31/0626* (2013.01); *A47J 31/18* (2013.01); *A47J 43/27* (2013.01); *B65D 43/0229* (2013.01); *B65D 47/089* (2013.01); *A47J 2201/00* (2013.01); *B65D 2543/00046* (2013.01); *B65D 2543/00092* (2013.01); *B65D 2543/00518* (2013.01); *B65D 2543/00546* (2013.01)

(58) Field of Classification Search
CPC ...... A47J 31/18; A47J 31/0626; A47J 31/005; A47J 43/27; A47J 2201/00; A47G 19/2272; A47G 23/0241; B65D 47/089; B65D 43/0229; B65D 2543/00518; B65D 2543/00546; B65D 2543/00092; B65D 2543/00046
See application file for complete search history.

(56) References Cited

U.S. PATENT DOCUMENTS 5,456,380 A * 10/1995 Ito ............... A47G 19/2272
220/713
5,918,761 A * 7/1999 Wissinger ......... A47G 19/2288
220/304
(Continued)

*Primary Examiner* — Bayan Salone
(74) *Attorney, Agent, or Firm* — Dale J. Ream

(57) ABSTRACT

A multifunction drinking assembly includes a primary container having a bottom wall and a continuous upstanding side wall, the side wall defining an open top and defining an interior area. An inner surface of the side wall includes a threaded section displaced from the upper rim and includes an upper ledge. The side wall has a lower ledge upwardly displaced from the bottom wall. A primary lid includes an upper portion having a rim and a top wall extending across the continuous rim, the primary lid having outer threads removably coupled to the threaded section of the side wall. The multifunction drinking assembly includes a coozie lid for securing either a can or bottle, a shaker lid for making mixed drinks, and an infuser assembly and steeper basket for holding loose leaf teas and fruit.

5 Claims, 22 Drawing Sheets

(56) References Cited

U.S. PATENT DOCUMENTS

| | | | | |
|---|---|---|---|---|
| 6,102,244 | A * | 8/2000 | Kuwano | A47G 19/2272 |
| | | | | 220/711 |
| 6,405,892 | B1 * | 6/2002 | Volan | A47G 19/2288 |
| | | | | 215/12.1 |
| 6,913,165 | B2 * | 7/2005 | Linz | A47J 43/27 |
| | | | | 220/568 |
| 7,032,507 | B2 * | 4/2006 | Cai | A47J 27/2105 |
| | | | | 99/317 |
| 7,571,830 | B2 * | 8/2009 | Lin | A47J 41/0016 |
| | | | | 206/217 |
| 7,958,816 | B2 * | 6/2011 | Lin | A47J 31/02 |
| | | | | 99/323 |
| 8,584,891 | B2 | 11/2013 | Hutchinson et al. | |
| 9,215,942 | B2 * | 12/2015 | Bodum | A47G 19/2272 |
| 9,452,876 | B2 * | 9/2016 | Anelevitz | A47G 19/2227 |
| 9,801,492 | B1 * | 10/2017 | Lin | A47G 19/2288 |
| 10,549,902 | B1 * | 2/2020 | Brown, II | B65D 53/02 |
| 2004/0040962 | A1 * | 3/2004 | Bielecki | A47G 19/2288 |
| | | | | 220/254.1 |
| 2006/0255035 | A1 * | 11/2006 | Lin | A47J 43/27 |
| | | | | 220/212 |
| 2007/0251956 | A1 * | 11/2007 | Wasserman | A47J 41/0027 |
| | | | | 222/189.07 |
| 2015/0250340 | A1 * | 9/2015 | Liu | B65D 47/286 |
| | | | | 220/254.9 |
| 2017/0121072 | A1 * | 5/2017 | Seiders | B65D 43/0229 |
| 2017/0121073 | A1 * | 5/2017 | Seiders | B29C 45/1657 |
| 2017/0121074 | A1 * | 5/2017 | Seiders | B65D 51/1605 |
| 2017/0210518 | A1 * | 7/2017 | Sato | B65D 51/18 |
| 2017/0233138 | A1 * | 8/2017 | Campbell | B65D 41/04 |
| | | | | 215/44 |
| 2018/0086540 | A1 * | 3/2018 | Haas | B65D 25/10 |

\* cited by examiner

MULTI-FUNCTIONAL MODULAR DRINK ASSEMBLY

REFERENCE TO RELATED APPLICATIONS

This application claims the priority of provisional patent application U.S. Ser. No. 62/640,729 filed Mar. 9, 2018 titled Multi-Functional Modular Drink Assembly which is incorporated in its entirety herein by reference.

BACKGROUND OF THE INVENTION

This invention relates generally to liquid containers and, more particularly, to a modular drink assembly with multiple components selectively interchangeable for attachment to a water container such as a mug or water bottle.

Water bottles are very popular among athletes, persons who work outdoors, and among virtually anyone with a desire to have a beverage that is always conveniently available. Further, many consumers have a desire to have a variety of beverages available to them and, more particularly, to have tea steeped from real tea leaves or a fruit drink from real fruit. At other times, a consumer may desire to make his own mixed drink. Unfortunately, making this variety of beverages requires multiple pieces of equipment to go along with a water vessel, such as a steeping basket, infuser screen, cocktail shaker, and the like. In addition, the consumer may want a traditional "coozie" to keep a prepared beverage cool or hot, such as keeping a bottle or can in a temperature controlled state.

Therefore, it would be desirable to have a modular drink assembly that combines all components within a modular assembly in which the various components to prepare the above-mentioned beverages is fast and easy.

SUMMARY OF THE INVENTION

A multifunction drinking assembly according to the present invention includes a primary container having a bottom wall and a side wall having a continuous configuration extending upwardly from the bottom wall, the side wall having an upper rim defining an open top and defining an interior area. The side wall has an inner surface that includes a threaded section displaced from the upper rim and that includes an upper ledge extending inwardly into the interior area. The side wall has a lower ledge upwardly displaced from the bottom wall and extending inwardly into the interior area. A primary lid includes an upper portion having a continuous rim and a top wall extending across the continuous rim, the primary lid that includes a lower portion having a diameter smaller than a diameter of the upper portion and having outer threads removably coupled to the threaded section of the side wall, whereby the primary lid is removably coupled to the primary container. In addition, the multifunction drinking assembly includes a coozie lid assembly, a shaker assembly, and an infuser assembly selectively coupled to the primary container when another lid assembly is not otherwise coupled thereto.

It is important to understand that the many components described herein are part of a single drinking assembly and are not disparate embodiments separate from one another.

Therefore, a general object of this invention is to provide a multi-functional and modular drink assembly for preparing and consuming water-based beverages created using a multiplicity of attachments.

Another object of this invention is to provide a modular drink assembly, as aforesaid, in which the attachments are modular and interchangeable.

Still another object of this invention is to provide a modular drink assembly, as aforesaid, which includes a steeping basket, an infuser screen, a cocktail shaker, and a lid system for mounting to a drink container.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a front view of the primary container as in FIG. 2a;

FIG. 16b is a sectional view taken along line 16b-16b of FIG. 16a;

DESCRIPTION OF THE PREFERRED EMBODIMENT

Figure 1:
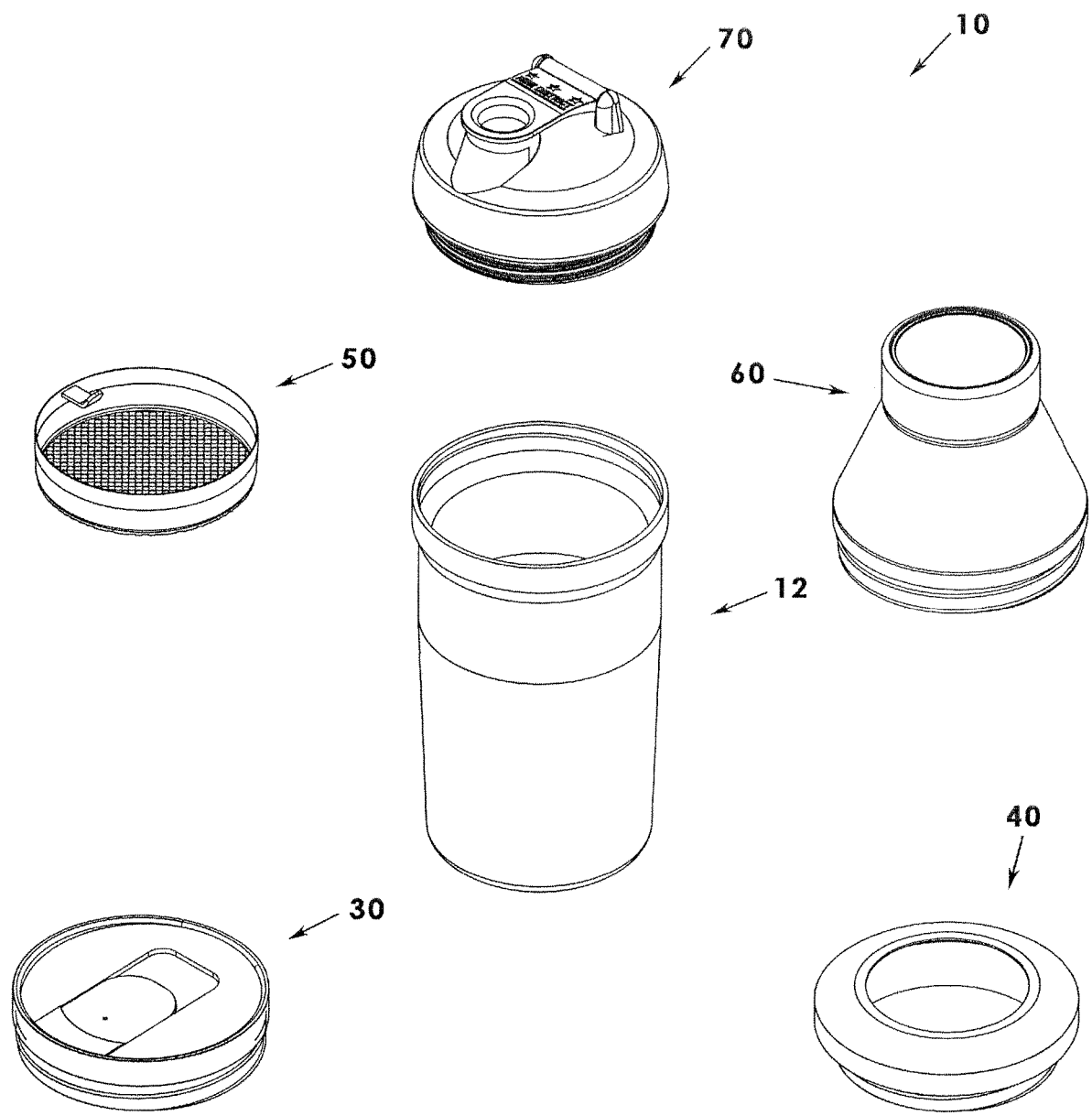
FIG. 1 is a perspective view of a multifunction drinking assembly, illustrated with all components according to the preferred embodiment of the present invention.

A multifunction drinking assembly according to a preferred embodiment of the present invention will now be described with reference to FIGS. 1 to 23 of the accompanying drawings. The multifunction drinking assembly 10 includes a primary container 12, a coozie lid 40, a shaker lid assembly 60, an infuser assembly 50, and an auxiliary lid 70.

The primary container 12, which may also be referred to as the "mug" is the primary container for holding water or a mixed beverage. The primary container 12 includes a bottom wall 14 and a side wall 16 that is upstanding and extends upwardly from the bottom wall 14. Preferably, the side wall 16 has a continuous wall configuration, i.e. has a cylindrical configuration. The side wall 16 has an upper rim 18 (i.e. an upper edge) that defines an open top, the side wall 16 and bottom wall 14 together defining an open interior area into which other components are received as will be described below.

Figure 4:
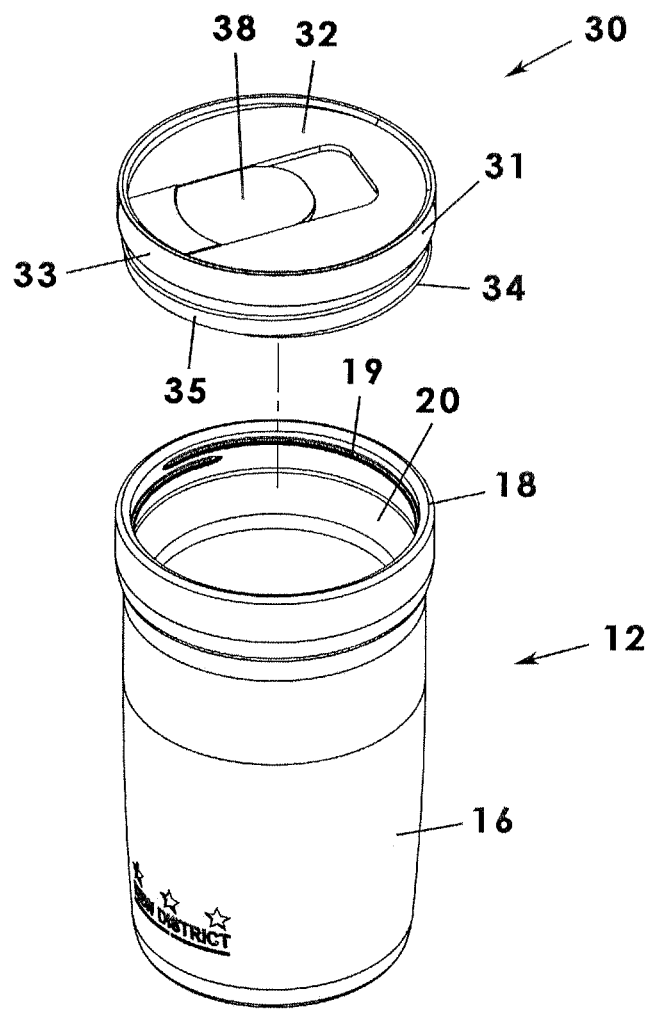
FIG. 4 is an exploded view of the primary container and primary lid as in FIG. 3.
Figure 5:
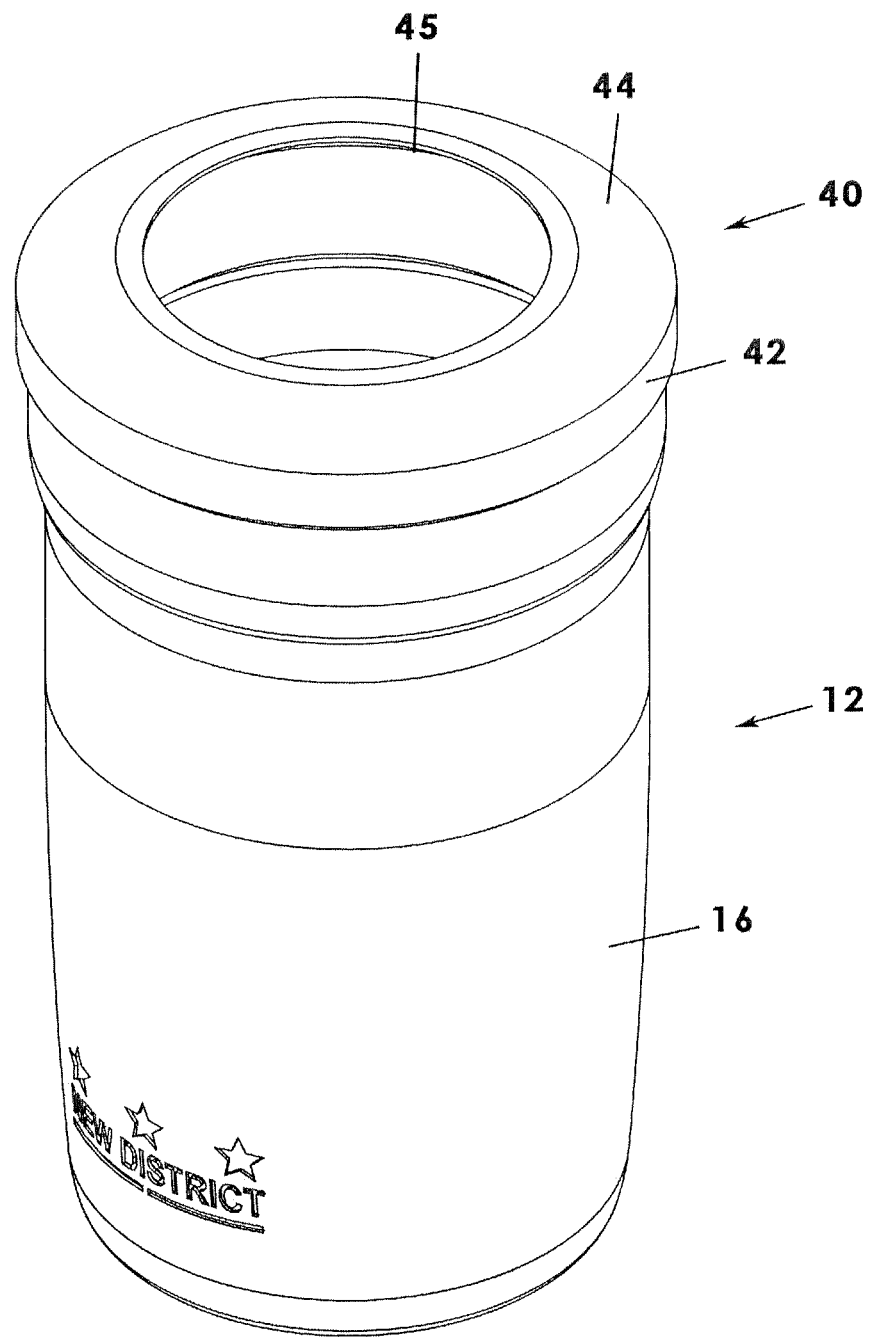
FIG. 5 is a perspective view of a coozie lid coupled to the primary container according to the present invention.
Figure 6:
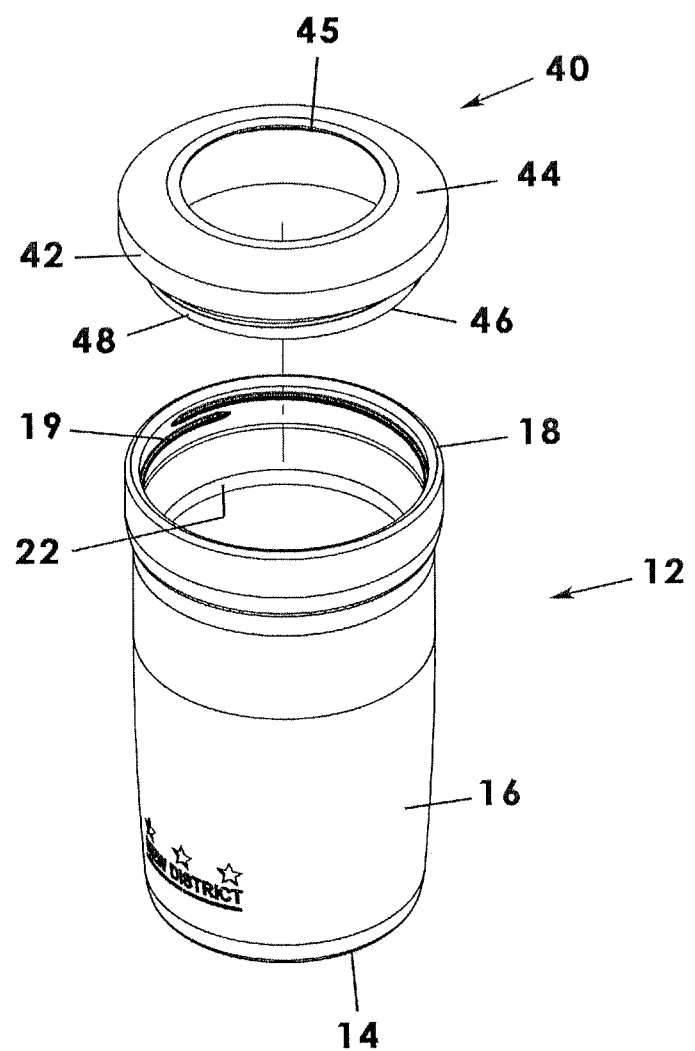
FIG. 6 is an exploded view of the primary container and coozie lid as in FIG. 5.
Figure 7:
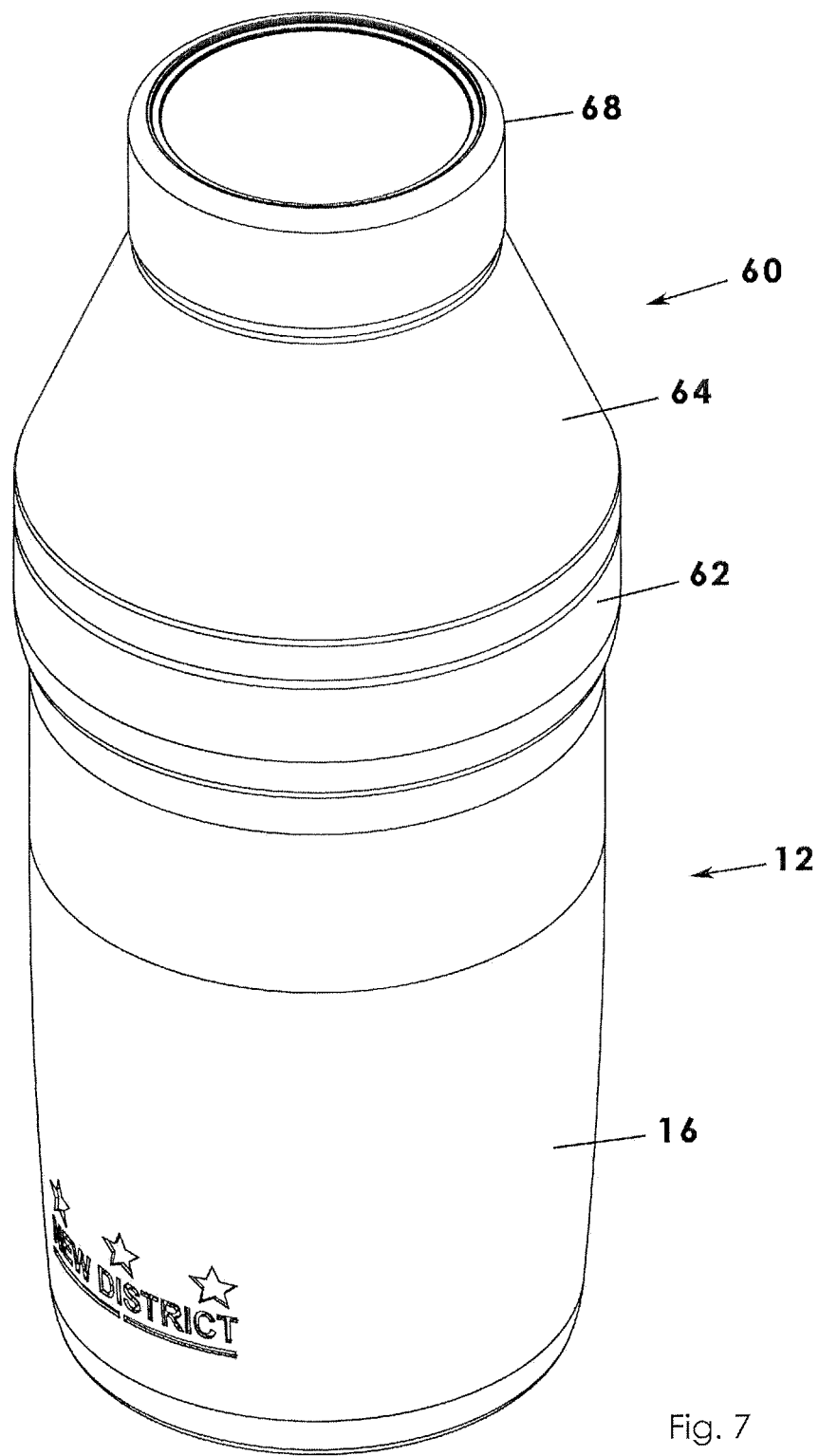
FIG. 7 is a perspective view of a shaker lid coupled to the primary container according to the present invention.
Figure 8:
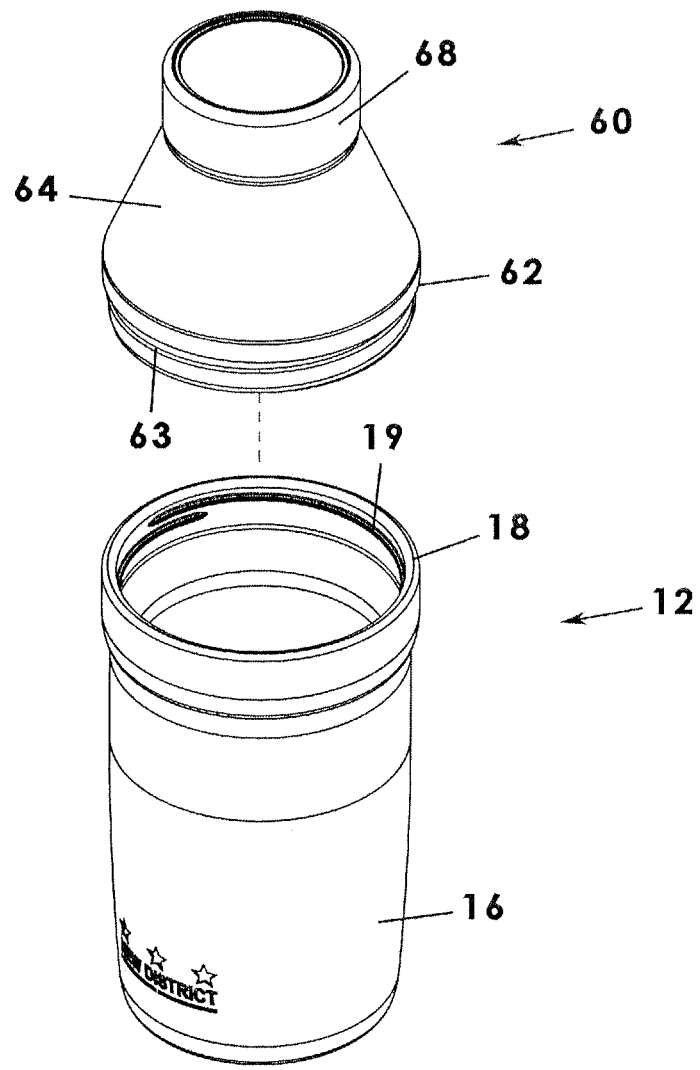
FIG. 8 is an exploded view of the primary container and shaker lid as in FIG. 7.
Figure 9:
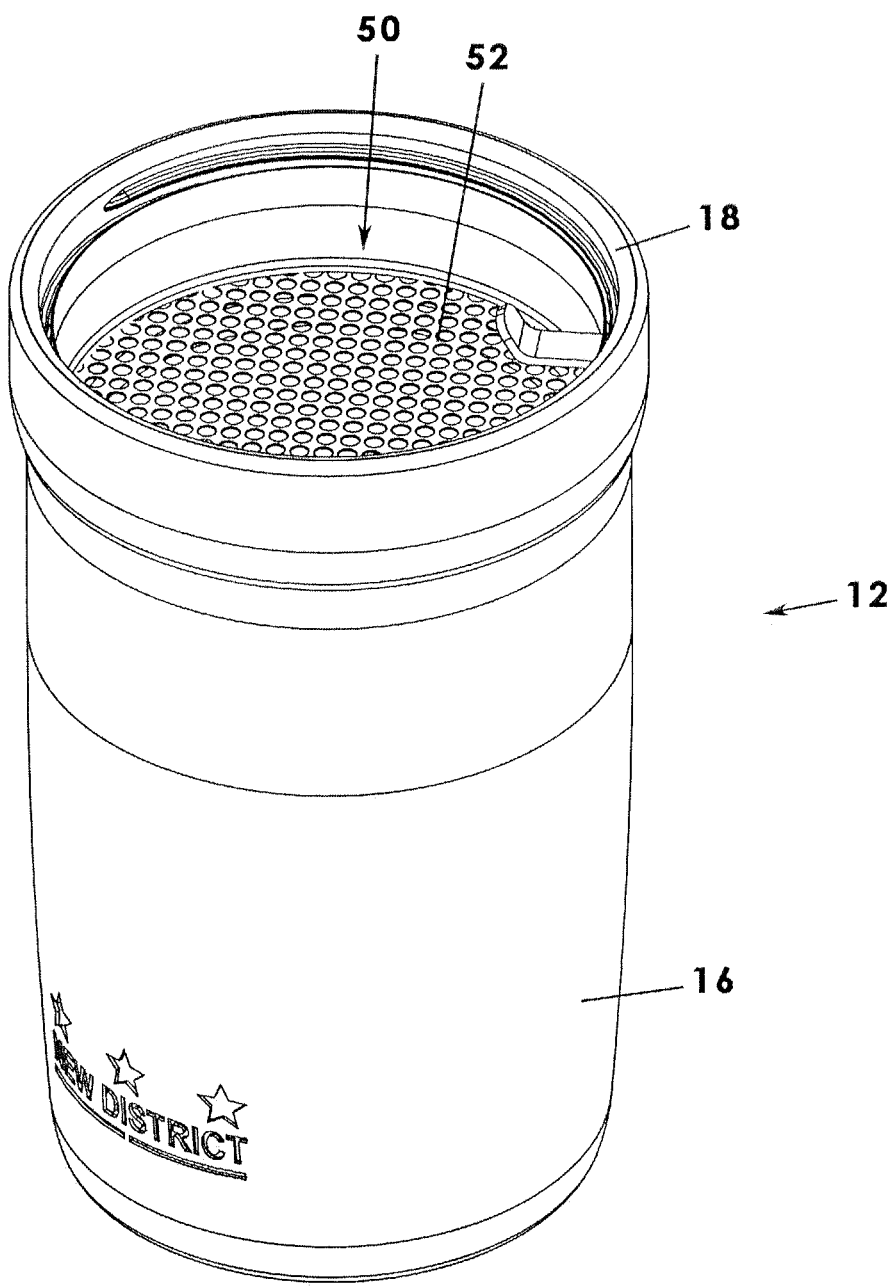
FIG. 9 is a perspective view of an infuser assembly coupled to the primary container according to the present invention.
Figure 10:
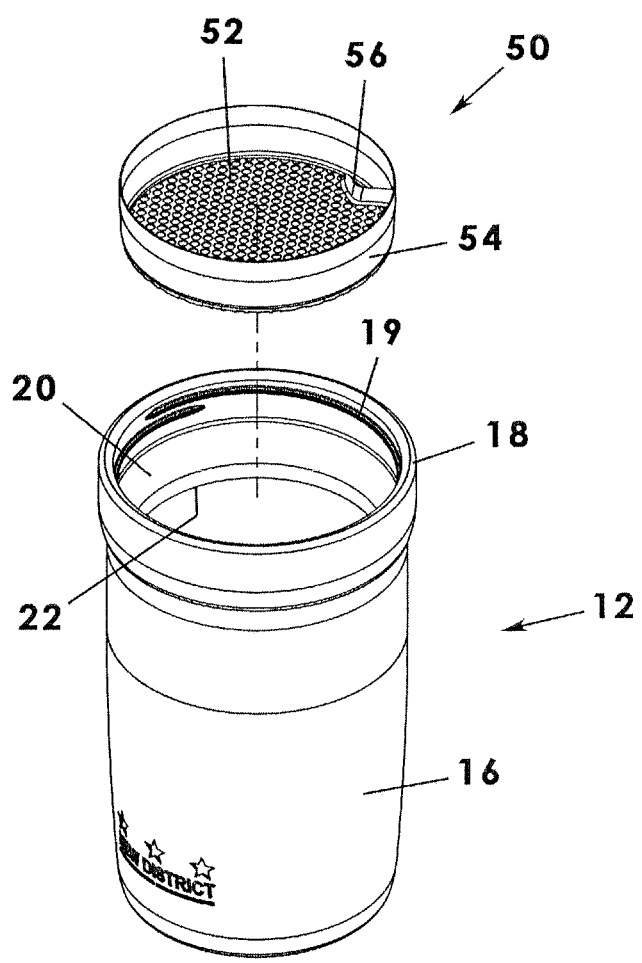
FIG. 10 is an exploded view of the primary container and infuser assembly as in FIG. 9.
Figure 11:
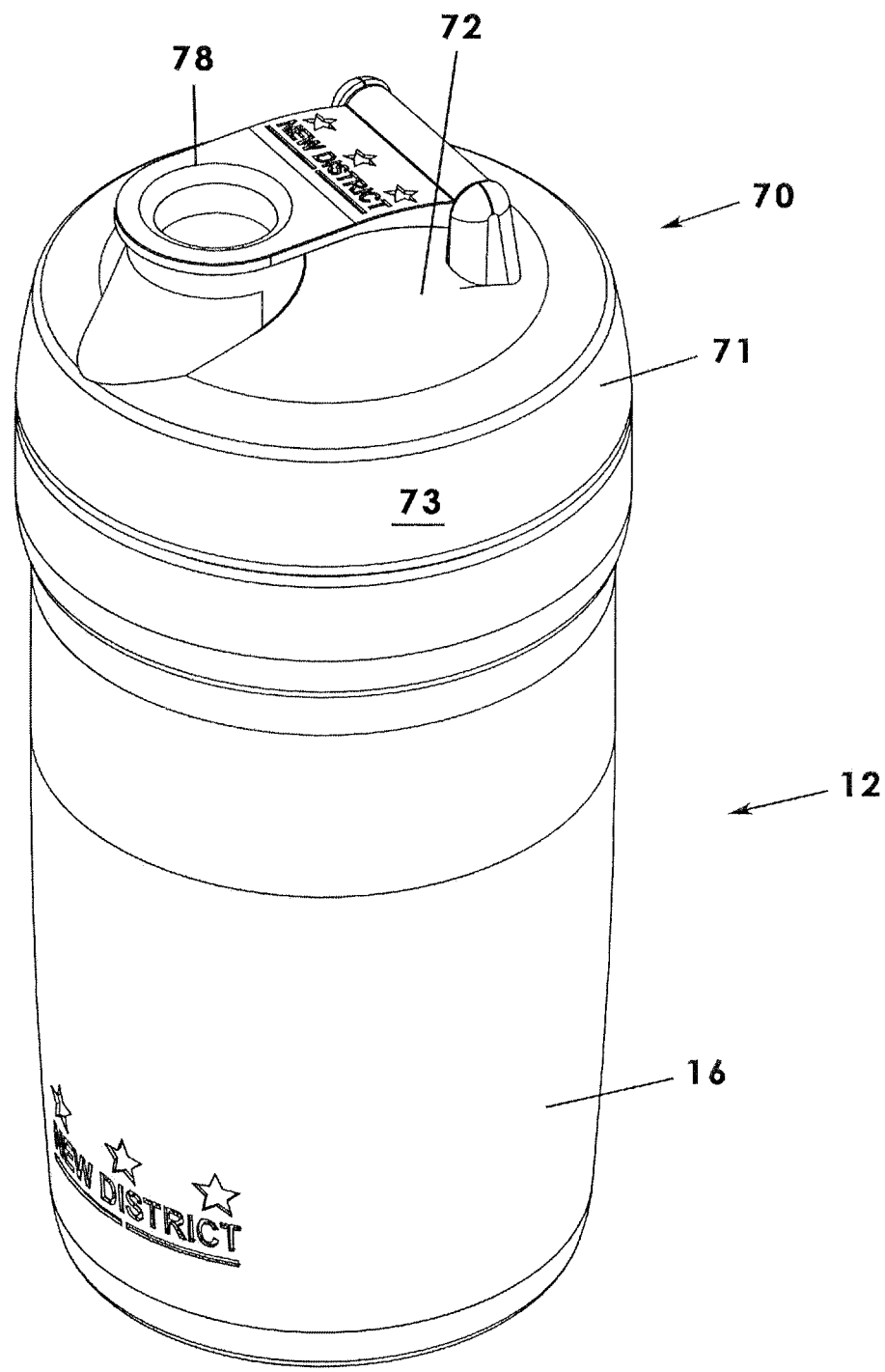
FIG. 11 is a perspective view of the auxiliary lid coupled to the primary container according to the present invention and illustrated with the cap in a closed configuration.
Figure 12:
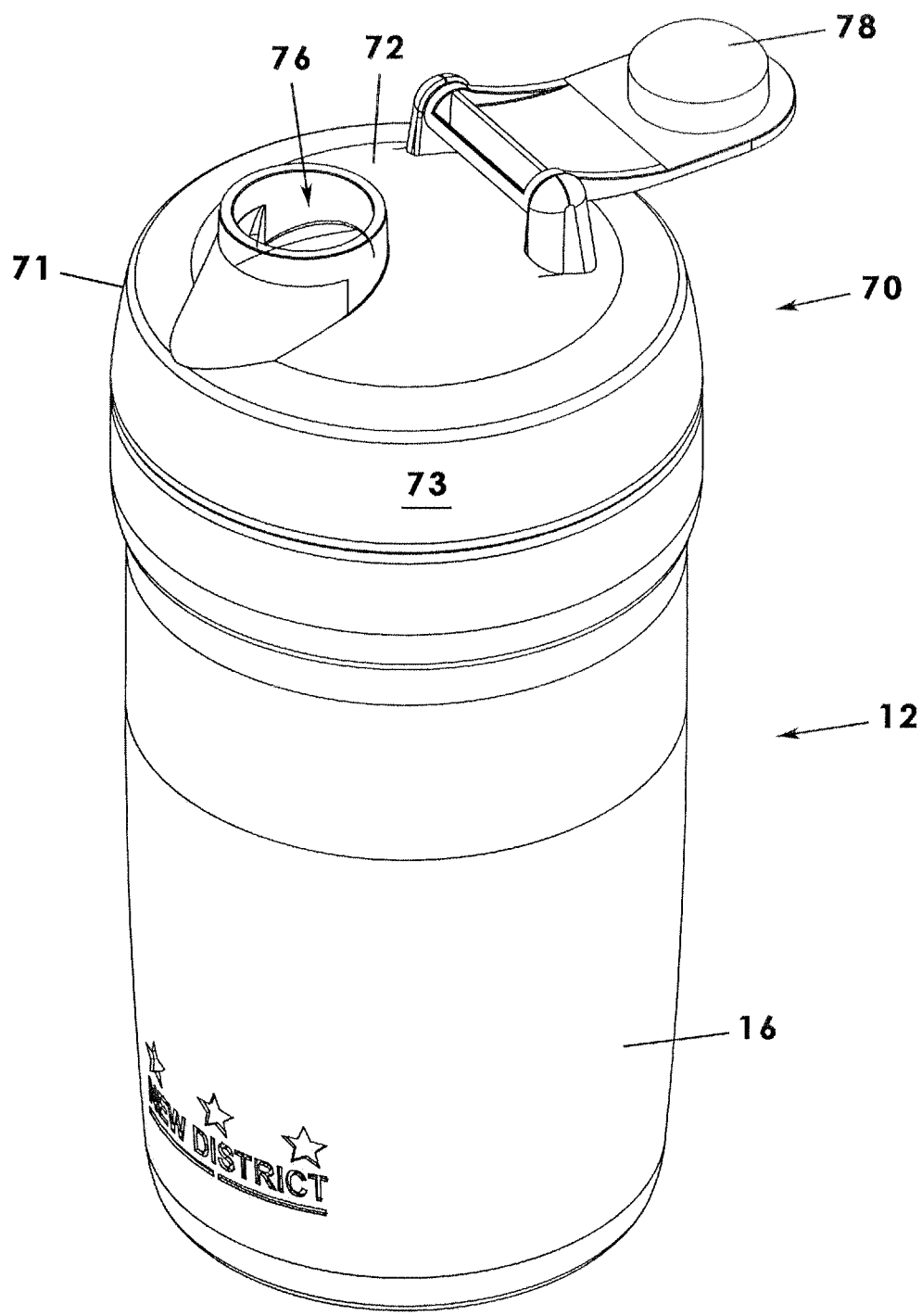
FIG. 12 is a perspective view of the auxiliary lid coupled to the primary container as in FIG. 11, illustrated with the cap in an open configuration.

The side wall 16 has an inner surface 20 that includes a threaded section 19 downwardly displaced from but adjacent to the upper rim 18 of the side wall 16 (FIGS. 1 and 4). The threaded section 19 has a horizontal orientation when the primary container 12 is setting on a level surface. This internal threaded section 19 is the means by which a primary lid 30 and other modular components are releasably coupled to the primary container 12 as will be described later. It will be appreciated that the threaded section 19 and complementary threaded portions of complementary lid sections—as will be described below—are coupled in a friction fit relationship and, in this sense, other friction fit configurations are also possible such as unthreaded press fit configurations (not shown). In the description below, each threaded section may be referred to as a press-fit or other friction fit section. A proper interpretation of the recitation of the claims should be consistent with the spirit of a friction fit configuration whether using threads or a press fit.

Figure 2A:
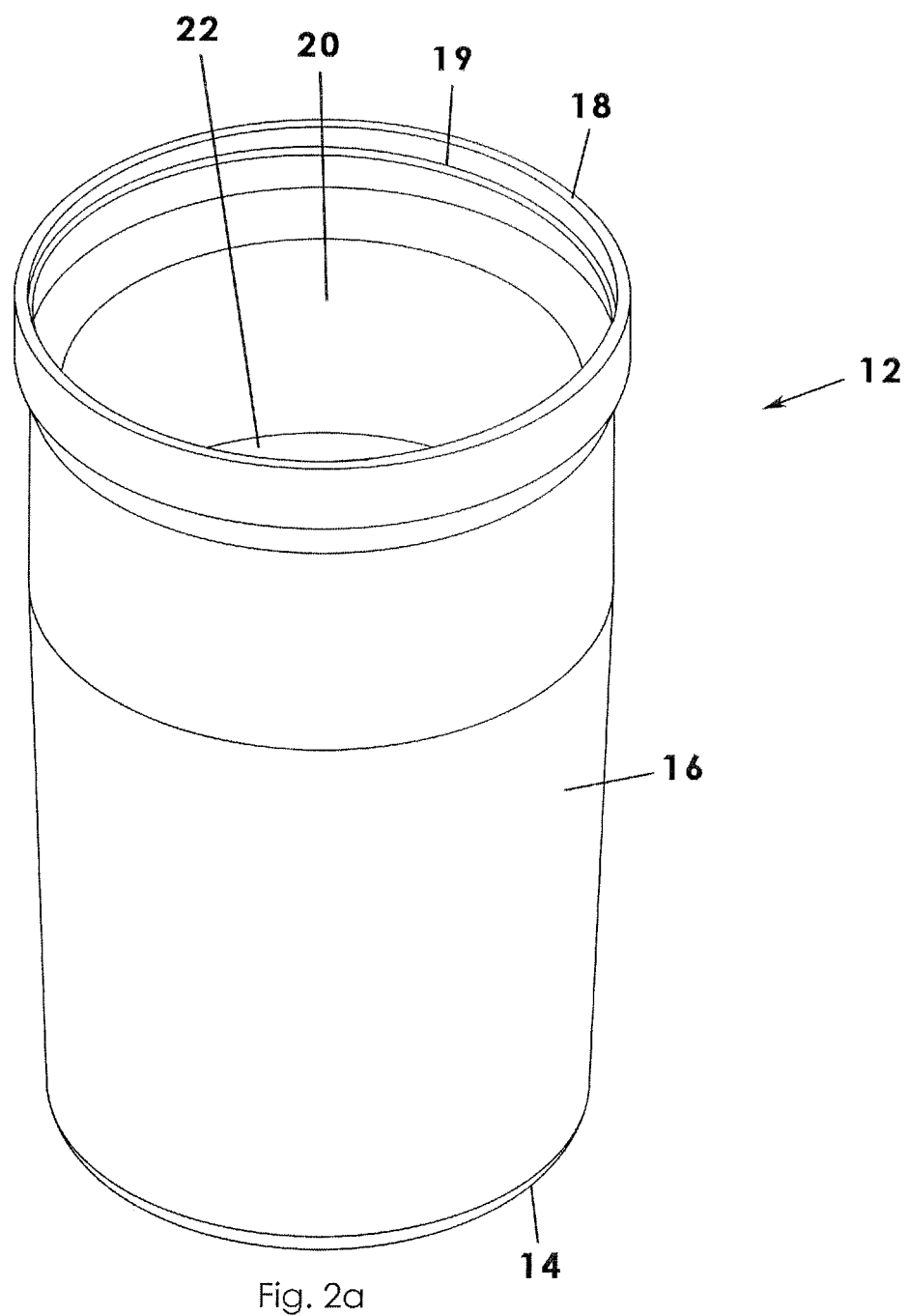
FIG. 2a is a perspective view of a primary container according to the drinking assembly shown in FIG. 1.
Figure 2B:
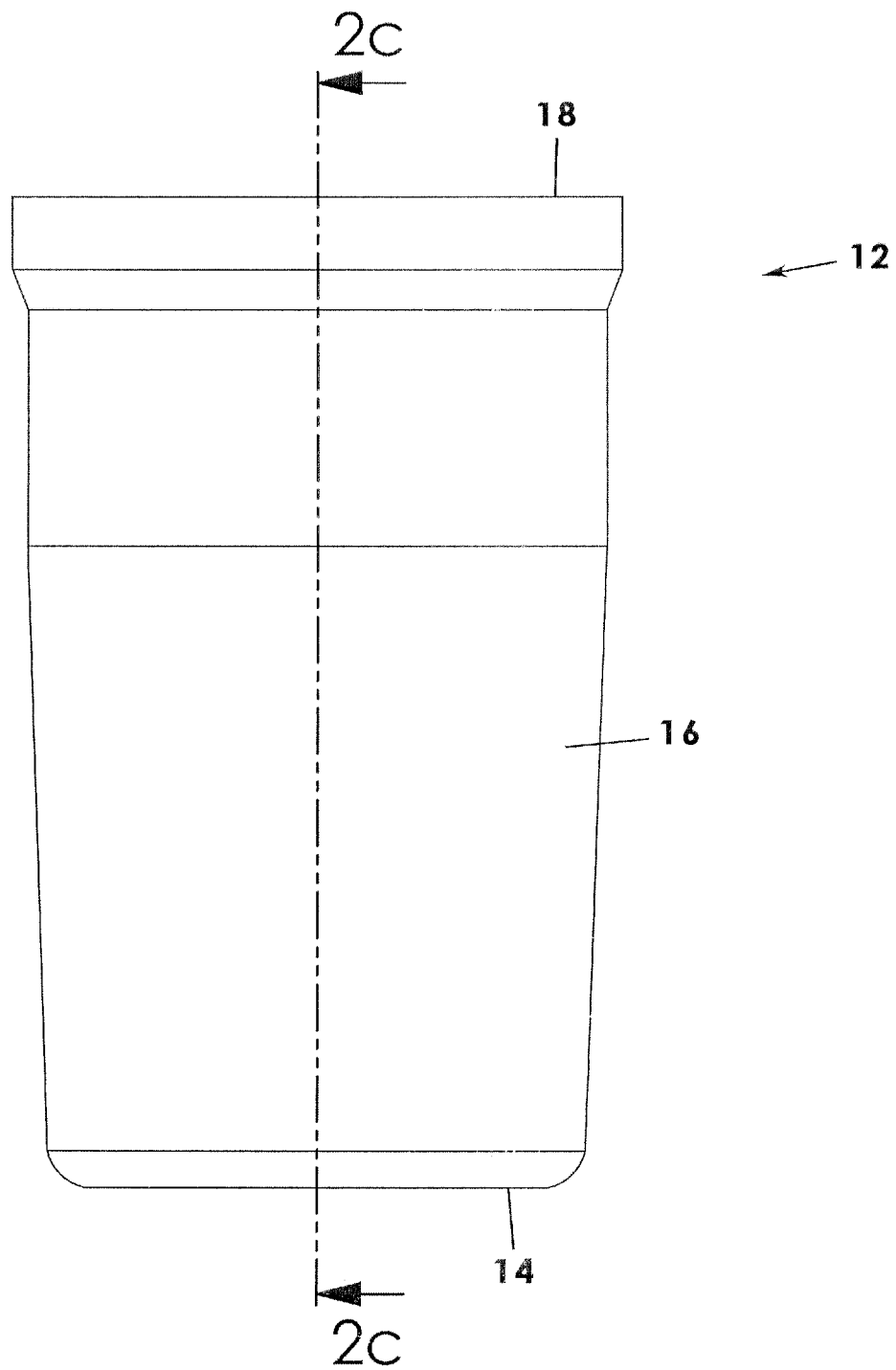
Figure 2C:
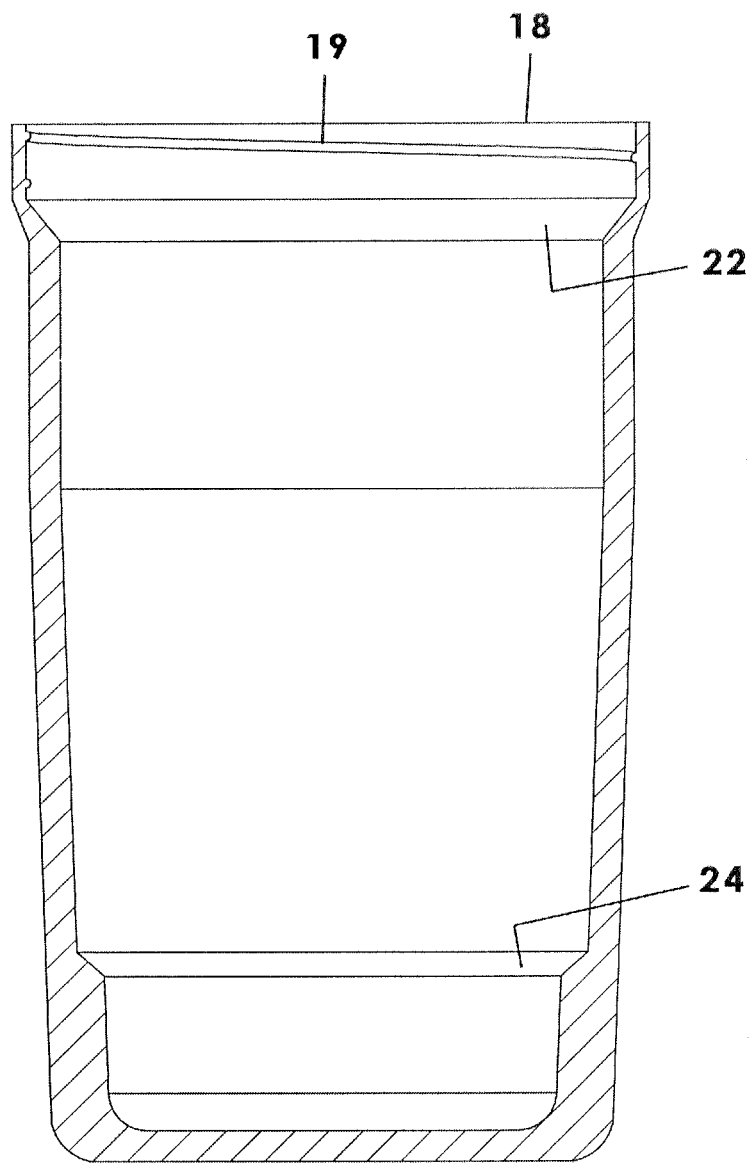
FIG. 2c is a sectional view taken along line 2c-2c of FIG. 2b.
Figure 3:
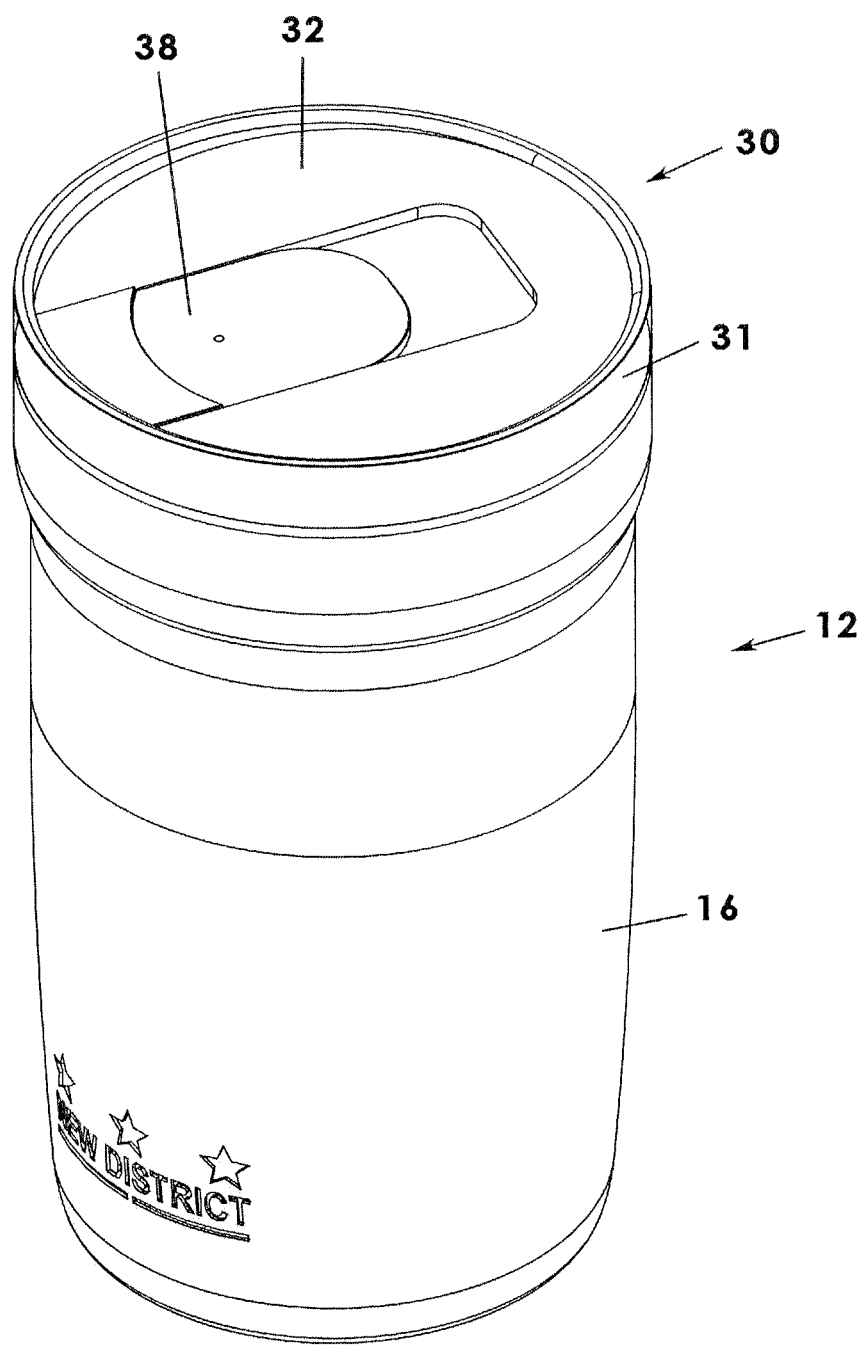
FIG. 3 is a perspective view of a primary lid coupled to the primary container according to the present invention.

The side wall 16 has an inner surface 20 that forms an upper ledge 22 and a lower ledge 24. More particularly, an upper ledge 22 is coupled to the inner surface of the side wall 16 and extends inwardly into the interior area. It is understood that the upper ledge 22 may be molded into the side wall 16, the upper ledge 22 being downwardly displaced from the threaded section 19 and parallel thereto (FIG. 2b). The upper ledge 22 only extends inwardly a predetermined distance into the interior area and not all the way between the inner surface walls. In fact, the upper ledge 22 may be the result of a narrowing and tapering of the inner surface 20 of the side wall 16. The upper ledge 22 has a dimension capable of supporting the infuser assembly 50 as will be described later. Similarly, the side wall 16 includes a lower ledge 24 extending inwardly from the inner surface into the interior space. The lower ledge 24 is displaced upwardly from the bottom wall 14 and displaced downwardly from the upper ledge 22. The lower ledge 24 is dimensioned to support a beverage can (not shown) thereon but otherwise does not extend all the way between the inner surface of the side wall 16. The lower ledge 24, however, has a diameter that will allow the bottom of a bottle to rest on the bottom wall 14*th*. The lower ledge 22 may be the result of a downward narrowing and tapering of the inner surface 20 of the side wall 16 (FIG. 2b).

In another aspect, the multifunction drinking assembly 10 includes a primary lid 30 that is releasably coupled to the primary container 12. More particularly, the primary lid 30 includes an upper portion 31 having a continuous rim 33 (i.e. a cylindrical ring) and a top wall 32 extending completely across and between the continuous rim 33. Further, the primary lid 30 includes a lower portion 34 having a smaller diameter than that of the upper portion 31 such that the lower portion 34 may be nested inside the upper rim 18 of the side wall 16 of the primary container 12 whereas the upper portion 31 is too large to be received therein. Further, the lower portion 34 includes outer threads 35 that are complementary to the threaded section 19 of the inner surface of the side wall 16 of the primary container and operable to selectively engage therewith. Accordingly, the primary lid 30 is movable between a configuration attached to the primary container 12 (FIG. 3) and a removed configuration displaced from the primary container 12 (FIG. 4). Again, the primary lid 30 may be coupled to the primary container 12 in a press-fit configuration with or without complementary threads.

In a preferred embodiment, the top wall 32 has a slidable door 38 (or equivalent cover) selectively providing or blocking drink access into the interior area of the primary container 12. More particularly, the top wall 32 of the primary lid 30 defines an aperture 36 that, when the primary lid 30 is coupled to the primary container 12, is in communication with the interior area and through which water or other beverage therein may be poured out or otherwise ingested. Further, the primary lid 30 includes a door 38 that is slidably coupled to the top wall 32 and is movable, such as by sliding, between a closed configuration covering the aperture 36 and blocking access to the interior space and an open configuration revealing the aperture 36 and allowing access to the interior space.

Figure 13:
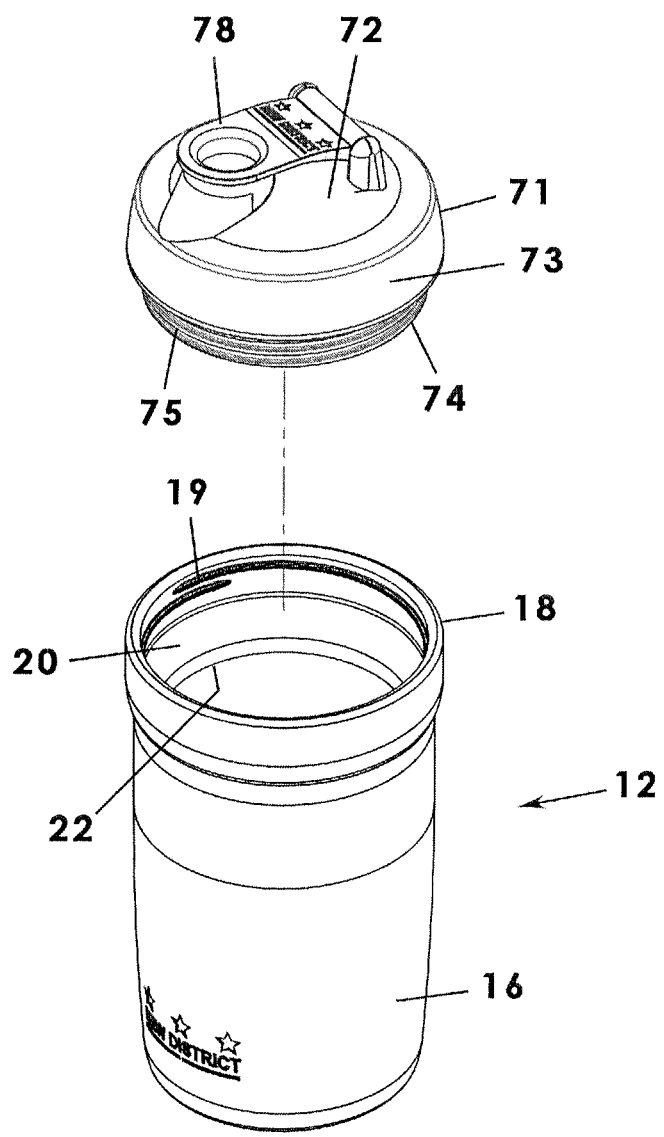
FIG. 13 is an exploded view of the primary container and auxiliary lid as in FIG. 11.
Figure 14:
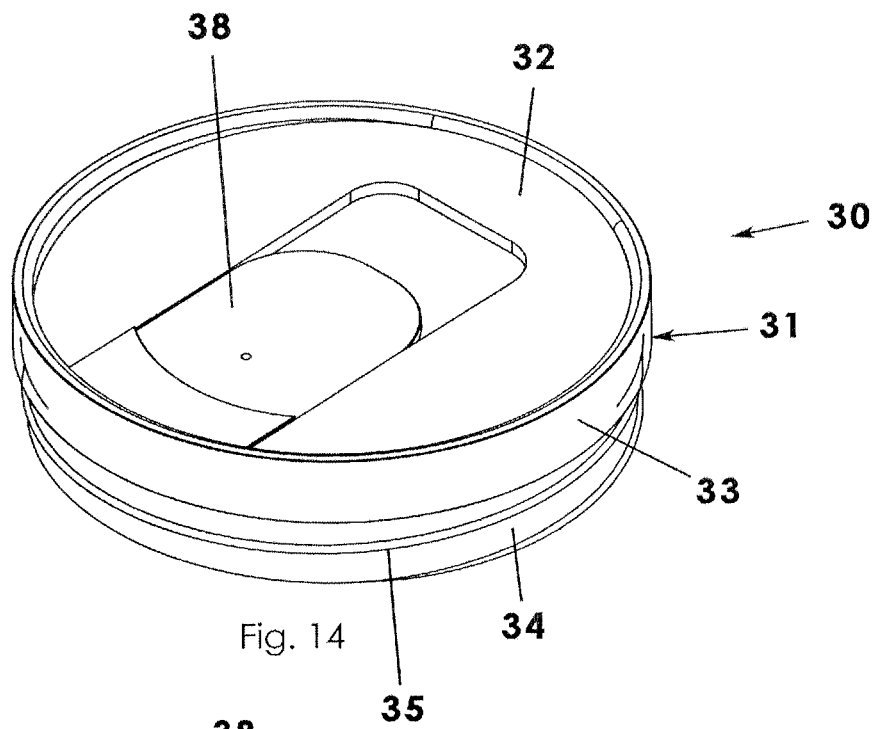
FIG. 14 is a perspective view of the primary lid as in FIG. 3 illustrated in a closed configuration.
Figure 15:
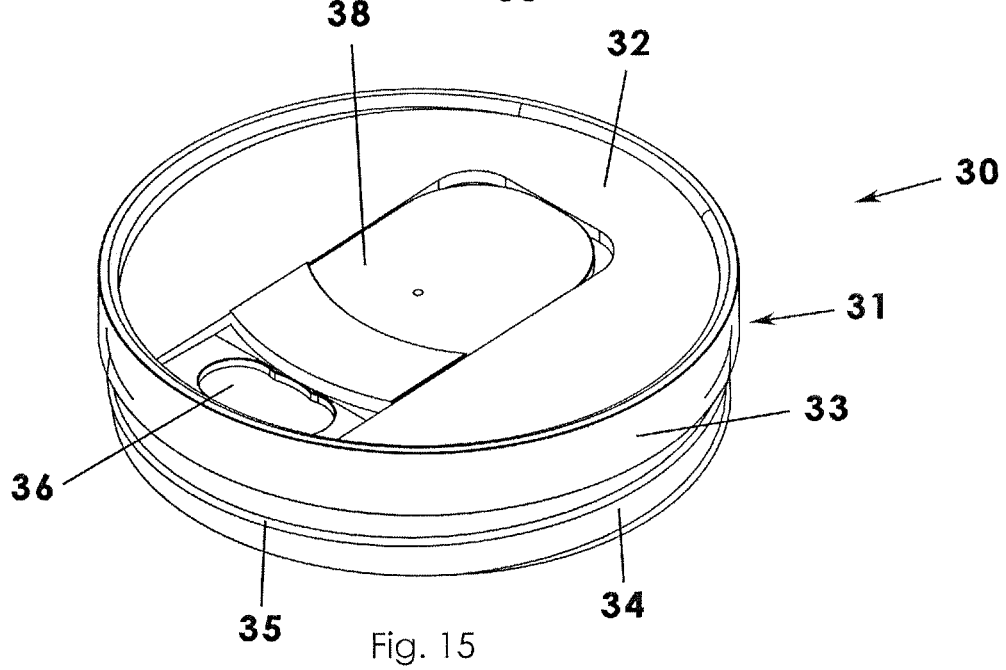
FIG. 15 an isolated perspective view of the primary lid as in FIG. 3 illustrated in an open configuration.
Figure 16A:
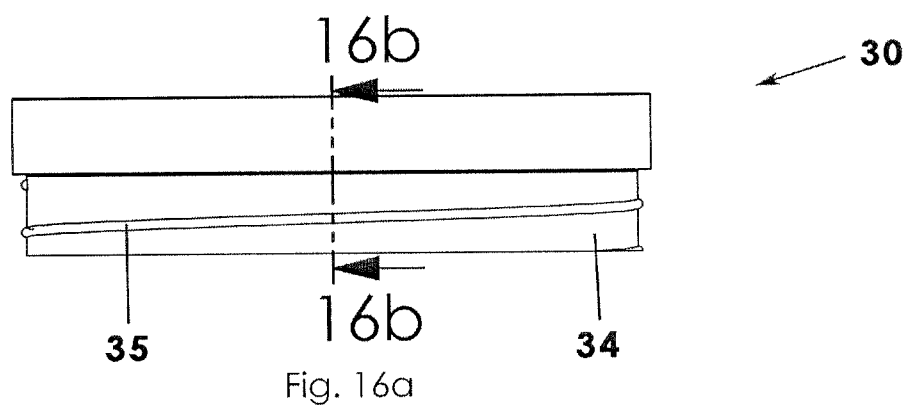
FIG. 16a is a side view of the primary lid as in FIG. 14.
Figure 16B:
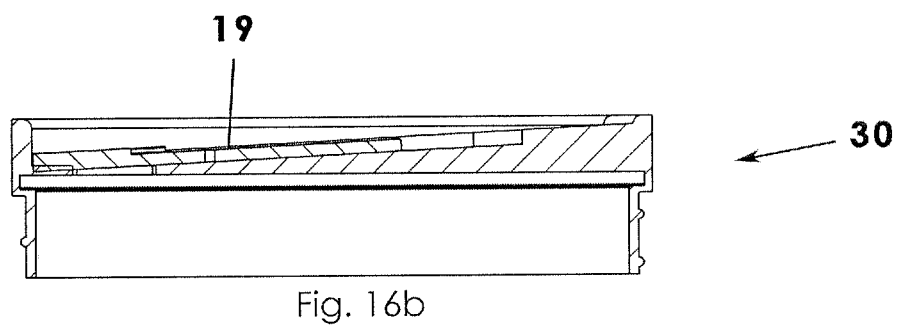
Figure 17:
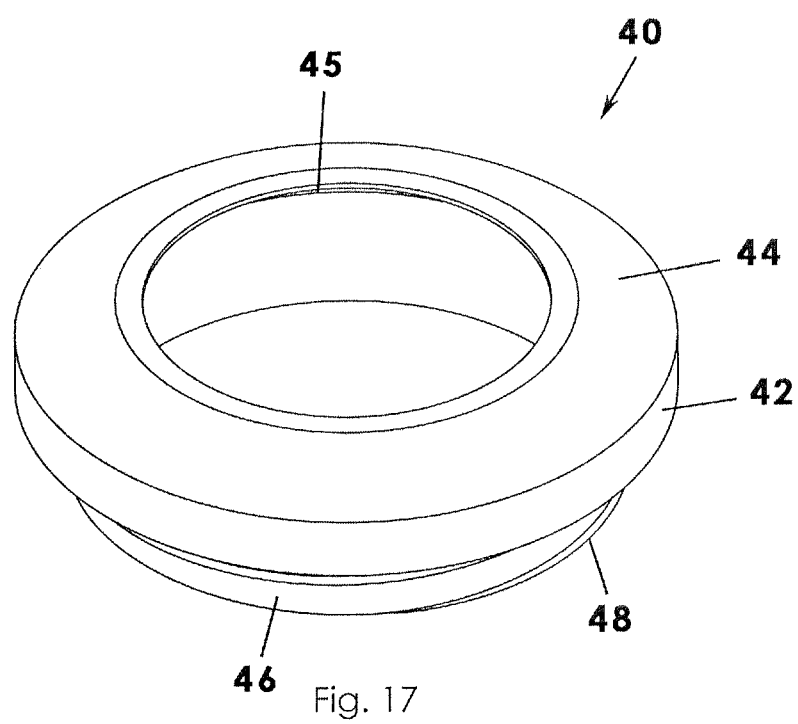
FIG. 17 is an isolated perspective view of the coozie lid as in FIG. 5.
Figure 18:
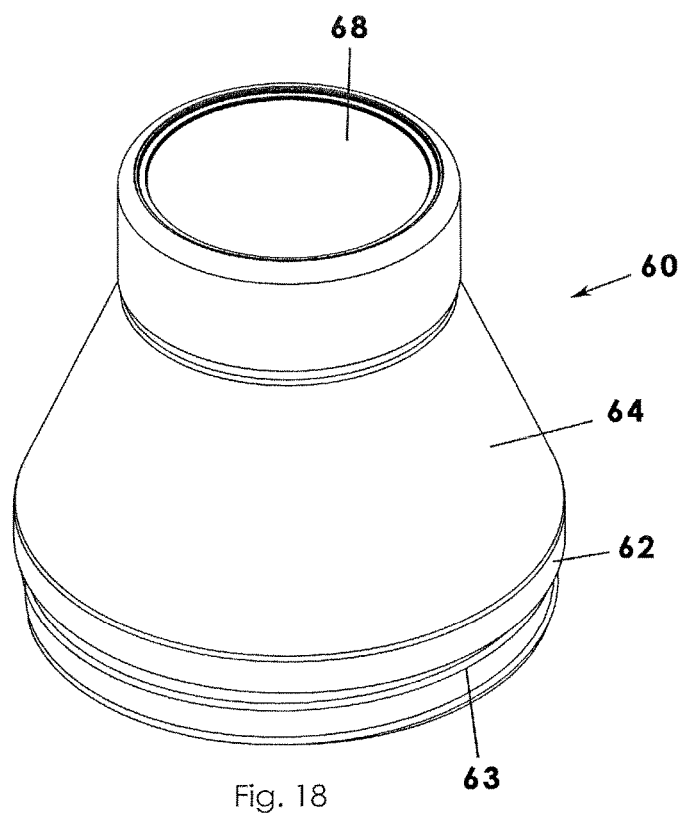
FIG. 18 is an isolated perspective view of the shaker lid assembly as in FIG. 7.
Figure 19:
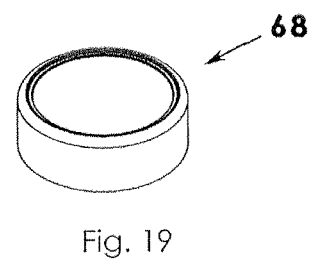
FIG. 19 is an isolated perspective view of a top cap removed from the shaker lid assembly of FIG. 18.
Figure 20:
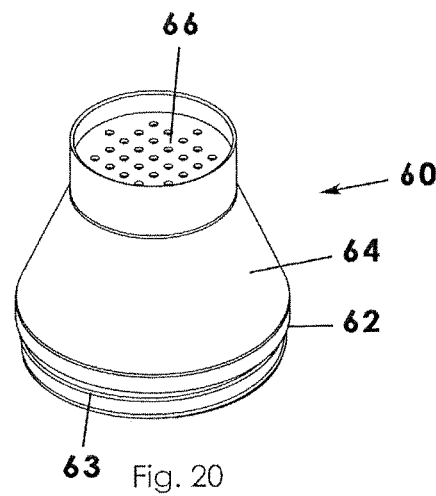
FIG. 20 is an isolated perspective view of the shaker lid assembly as in FIG. 18 with the top cap removed.
Figure 21:
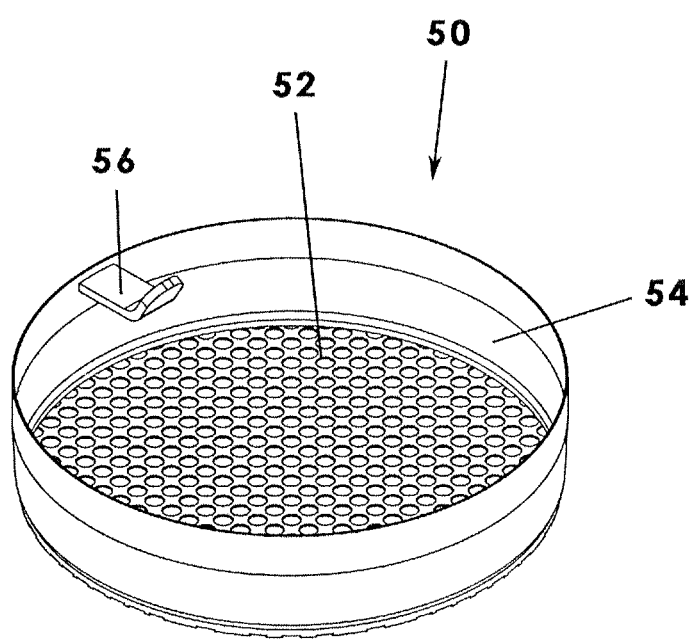
FIG. 21 is an isolated perspective view of the infuser assembly, aka steeper basket as in FIG. 9.
Figure 22:
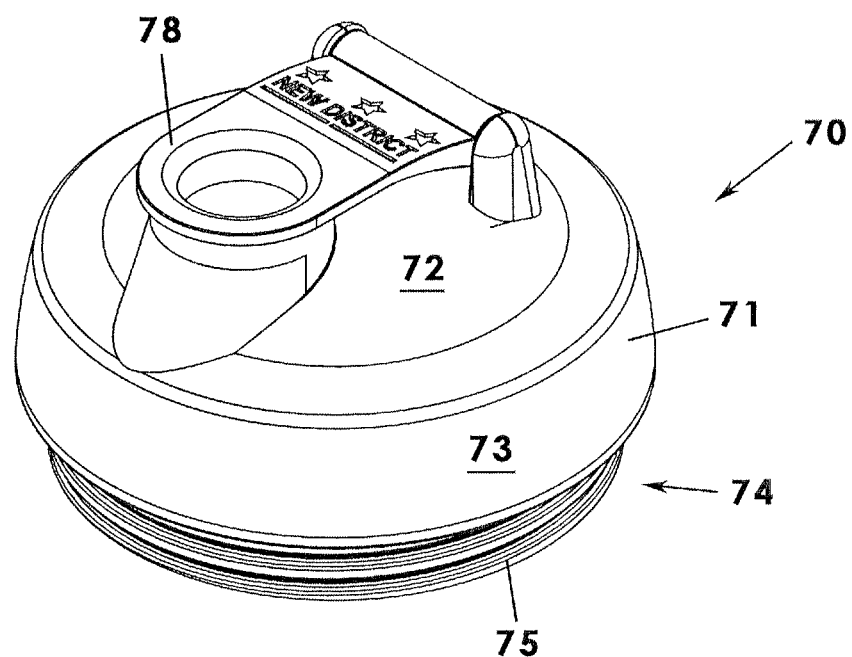
FIG. 22 is an isolated perspective view of the auxiliary lid as in FIG. 11.
Figure 23:
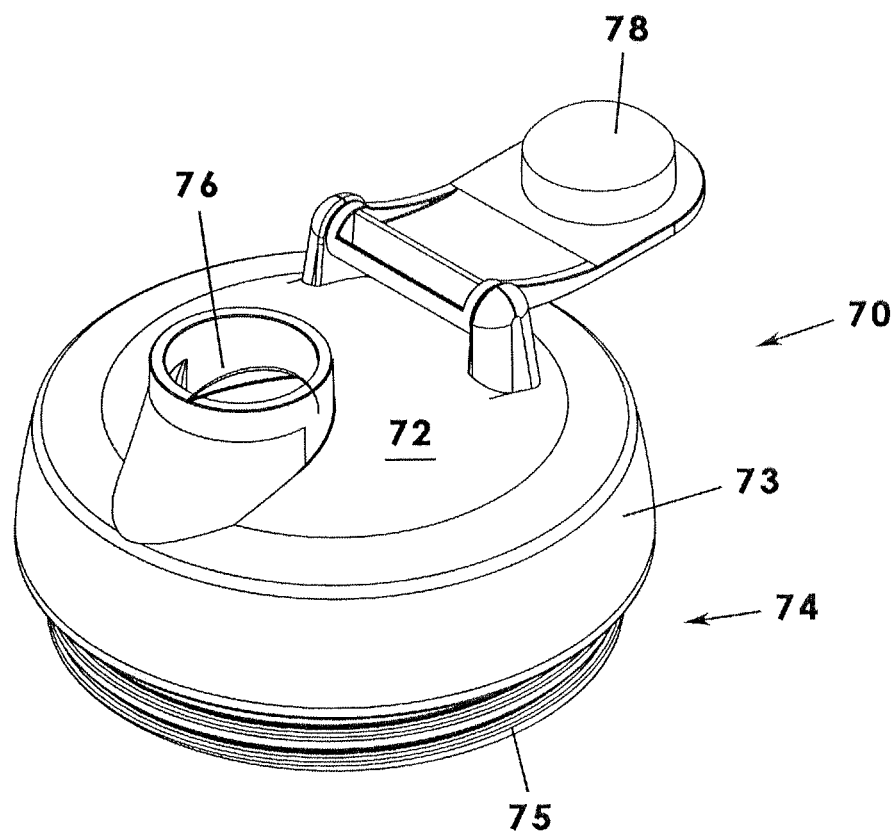
FIG. 23 is an isolated perspective view of the auxiliary lid as in FIG. 12.

Having a construction substantially similar to that of the primary lid 30, the multifunction drinking assembly 10 includes an auxiliary lid 70 that is releasably coupled to the primary container 12. More particularly, the auxiliary lid 70 includes an upper portion 71 having a continuous rim 73 (i.e. a cylindrical ring) and a top wall 72 extending completely across and between the continuous rim 73. Further, the auxiliary lid 70 includes a lower portion 74 having a smaller diameter than that of the upper portion 71 such that the lower portion 74 may be nested inside the upper rim 18 of the side wall 16 of the primary container 12 whereas the upper portion 31 is too large to be received therein. Further, the lower portion 74 may include outer threads 75 that are complementary to the threaded section 19 of the inner surface of the side wall 16 of the primary container 12 and operable to selectively engage therewith. Accordingly, the auxiliary lid 70 is movable between a configuration attached to the primary container 12 (FIG. 11) and a removed configuration displaced from the primary container 12 (FIG. 13). It will again be understood that the auxiliary lid 70 and primary container 12 may be coupled together in a press fit or other friction fit manner having no complementary threads.

With similarity to the slidable door 38 described above, the top wall 72 of the auxiliary lid 70 has a cap 78 selectively providing or blocking drink access into the interior area of the primary container 12. More particularly, the top wall 72 of the auxiliary lid 70 defines an aperture 76 that, when the auxiliary lid 70 is coupled to the primary container 12, is in communication with the interior area and through which water or other beverage therein may be poured out or otherwise ingested. Specifically, the auxiliary lid 70 includes a cap 78 that is pivotally coupled to the top wall 72 with a tether and is movable, such as by pivoting or simply be a frictional release, between a closed configuration covering the aperture 76 and blocking access to the interior space and an open configuration revealing the aperture 76 and allowing access to the interior space. It is understood that the cap 78, may be sealed tightly in a friction fit seal over the aperture 76 such that the entire drinking assembly 10 may be shaken without risk that the cap 78 will become inadvertently dislodged and the drink spilled. For instance, a user may deposit both water and a protein powder into the primary container 12, seal the cap 78, and then shake the assembly 10 to make a protein shake. The shake may then be ingested by popping open the cap 78.

In another aspect, the multifunction drinking assembly 10 includes a coozie lid 40 operable to securely receive a beverage bottle or beverage can into the interior area of the primary container 12 and from which the beverage may be consumed by a user. The coozie lid 40 may be coupled to the primary container 10 only when the primary lid 30 and any other component is removed from engagement with the primary container 12. For instance, the coozie lid 40 may only be coupled to the primary container 10 when the primary lid 30 is released and removed therefrom. More particularly, the coozie lid 40 includes an upper portion 42 having a continuous upper rim and a top wall 44 extending inwardly from the continuous upper rim, the top wall 44 defining an opening 45 dimensioned for receiving one of a beverage bottle or beverage can therethrough into the interior area. Further, the coozie lid 40 includes a lower portion 46 extending downwardly from the upper portion 42 and having a diameter smaller than a diameter of the upper portion 42 and having outer threads 48 that may be engaged with the threaded section 19 on the inner surface of the side wall of the primary container 12. In summary, the coozie lid 40 may be threadably coupled to the primary container 12 when the primary lid 30 and no other assembly is coupled thereto. In a manner substantially similar to that described above, the upper portion 42 may not have a threaded section but rather smooth surfaces selectively coupled in a press-fit or other friction fit arrangement.

It is understood that a beverage bottle received through the opening 45 of the top wall 44 is supported by the bottom wall 14 of the primary container 12. Similarly, a beverage can received in the opening 45 of the top wall 44 will rest atop the lower ledge 24 described above.

Further, the steeping basket, also referred to as an infuser assembly 50, includes a framework having a configuration that is complementary to a configuration of the upper ledge 22 for being supported thereon. A filter, such as a mesh screen 52, may extend across or be stretched between frame members of the framework. An upper rim wall 54 may extend upwardly from the bottom wall or screen peripheral edge to give the infuser assembly 50 an internal depth or interior space in which to receive tea leaves or the like. In use, the infuser assembly 50 allows full tea leaves or the like to be placed into the primary container 12 from which associated tea products are prepared. The primary lid 30 may be mounted above the steeping basket until preparation of the tea leaves and water is complete and then the steeping basket may be removed and the prepared tea may be consumed.

In an embodiment, a handle 56 may be coupled to the framework so as to use the steeping basket in a traditional manner to prepare tea for human consumption. The handle may be pivotally attached and selectively movable between a stowed configuration generally parallel to the screen and an extended configuration extending away from the screen and the framework.

In use, the framework and mesh screen 52 may also be positioned atop the lower ledge 24 above loose tea leaves, fruit, or the like, the mesh screen preventing such solid items from being ingested by a user who is drinking the water in the primary container 12. It is understood that the infuser assembly 50 has a configuration that allows it to be inserted and positioned atop the lower ledge 24 or that a second infuser assembly (not shown) having smaller dimensions than a first infuser assembly in order to be inserted below the upper ledge 22.

In another aspect, the present invention includes a mixer or shaker lid assembly 60 that enables mixed drinks to be prepared and consumed. Specifically, the shaker lid assembly 60 may include a lower portion 62 having a neck threaded portion 63 that may be selectively and threadably coupled to the threaded section 19 of the primary container 12. The shaker lid assembly 60 may include an upper portion 64 that has a conical or funnel shaped configuration extending upwardly from the neck of the lower portion 62 and that defines a plurality of apertures 66 in a top surface thereof through which a mixed drink may be poured. The shaker lid assembly 60 may also include a closed ended top cap 68. With the top cap in place, ingredients for the mixed drink may be poured into the assembly and threadably secured to the primary container 12 in the same manner as described above. In use, the top cap 68 may be removed and used as a shot glass. Also as described above, the shaker lid assembly 60 may be releasably coupled to the primary container 12 in a press-fit relationship instead of a threaded construction.

In use, any one of the accessories described above may be coupled singly to the primary container 12 as described. For instance, water or other beverage may be poured into the primary container 12 and the primary lid 30 may be coupled to the upper rim thereof. The beverage may then be consumed by a person using the slidable door 38 in a manner typical of insulated mug containers. Alternatively, the primary lid 30 may be threadably removed so that either the coozie lid 40, shaker lid assembly 60, or infuser assembly 50 may be coupled to the primary container 12 as desired for an intended purpose, respectively.

It is understood that while certain forms of this invention have been illustrated and described, it is not limited thereto except insofar as such limitations are included in the following claims and allowable functional equivalents thereof.

The invention claimed is:

1. A multifunction drinking assembly, comprising:
a primary container having a bottom wall and a side wall having a continuous configuration extending upwardly from said bottom wall, said side wall having an upper rim defining an open top and defining an interior area;
wherein said side wall has an inner surface that includes a threaded section displaced from said upper rim and that includes an upper ledge extending inwardly into said interior area;
wherein said side wall has a lower ledge upwardly displaced from said bottom wall and extending inwardly into said interior area;
a primary lid having an upper portion having a continuous rim and a top wall extending across said continuous rim, said primary lid that includes a lower portion having a diameter smaller than a diameter of said upper portion and having outer threads removably coupled to said threaded section of said side wall, whereby said primary lid is removably coupled to said primary container;

a coozie lid having an upper portion having a continuous upper rim and a top wall extending inwardly from said continuous upper rim defining an opening dimensioned to receive a beverage can into said interior area therethrough;

wherein said coozie lid includes a lower portion having a diameter smaller than a diameter of said continuous upper rim and having outer threads removably coupled to said threaded section of said side wall, whereby said coozie lid is removably coupled to said primary container when said primary lid is not coupled thereto; and a shaker lid assembly that includes a lower portion having a neck threaded portion and a cylindrical configuration and having an upper portion extending upwardly from the lower portion and having a conical configuration and defining a plurality of apertures at an upper surface thereof, a lower extent of said lower portion having outer threads removably coupled to said threaded section of said side wall so that said shaker lid is removably coupled to said primary container when said primary lid is not coupled thereto.

2. The multifunction drinking assembly as in claim 1, further comprising an infuser assembly having a bottom wall that includes a screen and an upstanding rim wall extending upwardly from a peripheral edge of said bottom wall, said infuser assembly operably seated atop said upper ledge of said primary container when said primary lid, said shaker lid, and said coozie lid are not simultaneously coupled to said side wall.

3. The multifunction drinking assembly as in claim 1, wherein:
said upper ledge is downwardly displaced from said threaded section;
said threaded section of said primary container has a horizontal orientation and said upper ledge is parallel to said threaded section.

4. The multifunction drinking assembly as in claim 1, wherein said shaker lid assembly includes a mixer lid top having a cylindrical configuration defining an open bottom, said shaker lid being removably coupled to said upper portion of said shaker lid assembly in a friction fit engagement.

5. The multifunction drinking assembly as in claim 1, wherein:
said top wall of said primary lid defines an aperture that is, when said primary lid is coupled to said primary container via said outer threads, in communication with interior area defined by said side wall; and
said primary lid includes a door slidably coupled to said top wall that is slidably movable between a closed configuration covering said aperture and an open configuration allowing access to said aperture.

* * * * *